United States Patent
Kawamura et al.

(10) Patent No.: US 12,528,242 B2
(45) Date of Patent: Jan. 20, 2026

(54) METHOD FOR PRODUCING RESIN VESSEL MADE OF RESIN, MOULD UNIT AND MOULDING APPARATUS

(71) Applicant: NISSEI ASB MACHINE CO., LTD., Nagano (JP)

(72) Inventors: Ryo Kawamura, Nagano (JP); Manabu Ogihara, Nagano (JP); Junji Takahashi, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 923 days.

(21) Appl. No.: 17/580,260

(22) Filed: Jan. 20, 2022

(65) Prior Publication Data

US 2022/0143897 A1 May 12, 2022

Related U.S. Application Data

(63) Continuation of application No. 16/516,128, filed on Jul. 18, 2019, now Pat. No. 11,260,575, which is a
(Continued)

(30) Foreign Application Priority Data

Oct. 19, 2017 (JP) .................. 2017-202716

(51) Int. Cl.
*B29C 49/06* (2006.01)
*B29C 49/12* (2006.01)
(Continued)

(52) U.S. Cl.
CPC .......... *B29C 49/6427* (2013.01); *B29C 49/06* (2013.01); *B29C 49/12* (2013.01);
(Continued)

(58) Field of Classification Search
CPC . B29C 49/48; B29C 49/4823; B29C 49/6427; B29C 49/6463; B29C 49/06;
(Continued)

(56) References Cited

U.S. PATENT DOCUMENTS

| 3,980,192 A | 9/1976 | Hafner et al. |
| 4,091,059 A | 5/1978 | Ryder |

(Continued)

FOREIGN PATENT DOCUMENTS

| CN | 1613643 | 6/2010 |
| CN | 103732501 | 4/2014 |

(Continued)

OTHER PUBLICATIONS

Office Action issued in Corresponding JP Patent Application No. 2019-206267, dated Aug. 28, 2024, along with an English translation thereof.
(Continued)

*Primary Examiner* — Christina A Johnson
*Assistant Examiner* — Kelsey C Grace
(74) *Attorney, Agent, or Firm* — Greenblum & Bernstein, P.L.C.

(57) ABSTRACT

Provided is a method for manufacturing a container 10 made of resin, the method including an injection molding step S1, a temperature adjustment step S2, and a blow molding step S3. In the temperature adjustment step S2, a preform 11 is accommodated in a cavity mold 31, an air introduction member 32 is brought into airtight contact with the preform 11, the air is supplied from a blowing port of the air introduction member 32 into the preform 11, and the air is discharged from a discharge port of the air introduction member 32 to an outside of the preform 11, so that the preform 11 is in close contact with an inner wall of the cavity mold 31 and is cooled.

8 Claims, 10 Drawing Sheets

Related U.S. Application Data continuation of application No. PCT/JP2018/039007, filed on Oct. 19, 2018.

(51) Int. Cl.
*B29C 49/64* (2006.01)
*B29C 49/48* (2006.01)
*B29K 67/00* (2006.01)
*B29L 31/00* (2006.01)

(52) U.S. Cl.
CPC .................. *B29C 2049/4881* (2022.05); *B29K 2067/003* (2013.01); *B29L 2031/712* (2013.01)

(58) Field of Classification Search
CPC ........ B29C 45/7207; B29C 2949/0715; B29C 2049/023; B29C 49/6467; B29C 49/643; B29C 49/6465; B29C 2045/7214; B29C 2049/4835; B29C 49/12; B29L 2031/712; B29K 2995/004; B29K 2067/003
See application file for complete search history.

(56) References Cited

U.S. PATENT DOCUMENTS

| | | | |
|---|---|---|---|
| 5,182,122 | A | 1/1993 | Uehara et al. |
| 5,352,402 | A * | 10/1994 | Orimoto ............... B29C 49/16 264/235 |
| 5,364,585 | A | 11/1994 | Takeuchi |
| 5,501,589 | A | 3/1996 | Marcus |
| 5,589,130 | A | 12/1996 | Takada et al. |
| 5,620,650 | A | 4/1997 | Nakajima et al. |
| 5,679,306 | A | 10/1997 | Nakajima et al. |
| 5,869,110 | A | 2/1999 | Ogihara |
| 6,171,541 | B1 | 1/2001 | Neter et al. |
| 6,299,431 | B1 | 10/2001 | Neter |
| 6,312,641 | B1 | 11/2001 | Hutchinson |
| 6,332,770 | B1 | 12/2001 | Oueslati et al. |
| 6,352,426 | B1 | 3/2002 | Hutchinson et al. |
| 6,391,408 | B1 | 5/2002 | Hutchinson |
| 6,461,556 | B2 | 10/2002 | Neter |
| 6,475,415 | B1 | 11/2002 | Neter et al. |
| 6,475,422 | B1 | 11/2002 | Neter et al. |
| 6,488,878 | B1 | 12/2002 | Neter et al. |
| 2001/0005063 | A1 | 6/2001 | Neter |
| 2002/0074687 | A1 | 6/2002 | Neter et al. |
| 2002/0090473 | A1 | 7/2002 | Lee et al. |
| 2003/0001315 | A1 | 1/2003 | Hutchinson et al. |
| 2003/0012904 | A1 | 1/2003 | Hutchinson et al. |
| 2003/0108638 | A1 | 6/2003 | Neter et al. |
| 2003/0219555 | A1 | 11/2003 | Hutchinson et al. |
| 2004/0022974 | A1 | 2/2004 | Nakamura et al. |
| 2004/0247735 | A1 | 12/2004 | Hutchinson et al. |
| 2005/0011892 | A1 * | 1/2005 | Nakajima ............... B32B 27/36 220/62.22 |
| 2005/0053739 | A1 | 3/2005 | Lee et al. |
| 2006/0290035 | A1 | 12/2006 | Yoshiike et al. |
| 2008/0029929 | A1 | 2/2008 | Hutchinson et al. |
| 2008/0044605 | A1 | 2/2008 | Lee et al. |
| 2008/0061476 | A1 | 3/2008 | Hutchinson et al. |
| 2008/0277840 | A1 | 11/2008 | Yanagimachi et al. |
| 2010/0109206 | A1 | 5/2010 | Hutchinson et al. |
| 2013/0147097 | A1 | 6/2013 | Lane et al. |
| 2014/0144105 | A1 | 5/2014 | Hayakawa et al. |
| 2018/0001539 | A1 | 1/2018 | Horigome et al. |
| 2018/0079122 | A1 | 3/2018 | Aoki et al. |
| 2018/0079127 | A1 | 3/2018 | Aoki |
| 2019/0022913 | A1 | 1/2019 | Takehana et al. |

FOREIGN PATENT DOCUMENTS

| | | |
|---|---|---|
| JP | 57-103821 | 6/1982 |
| JP | 04-275130 | 9/1992 |
| JP | 5-185493 | 7/1993 |
| JP | 05-228991 | 9/1993 |
| JP | 5-330535 | 12/1993 |
| JP | 07-117112 | 5/1995 |
| JP | 8-300460 | 11/1996 |
| JP | 11-34152 | 2/1999 |
| JP | 2931428 | 8/1999 |
| JP | H11-235752 | 8/1999 |
| JP | 2002-509817 | 4/2002 |
| JP | 2002-172681 | 6/2002 |
| JP | 2003-103615 | 4/2003 |
| JP | 2003-236923 | 8/2003 |
| JP | 2005-007797 | 1/2005 |
| JP | 2008-279611 | 11/2008 |
| KR | 10-0155454 | 12/1998 |
| WO | 2006/124200 | 11/2006 |
| WO | 2016/148189 | 9/2016 |
| WO | 2017/002150 | 1/2017 |
| WO | 2017/098673 | 6/2017 |
| WO | 2017/170942 | 10/2017 |

OTHER PUBLICATIONS

Extended European Search Report Issued in Corresponding EP Patent Application No. 24154070.7, dated May 14, 2024.
Office Action issued in Corresponding KR Patent Application No. 10-2022-7027439, dated Apr. 24, 2023, along with an English translation thereof.
Office Action Issued in Corresponding JP Patent Application No. 2019-206267, dated Jun. 21, 2022, along with an English translation thereof.
Office Action issued in Corresponding KR Patent Application No. 10-2022-7013412, dated Feb. 29, 2024, along with an English translation thereof.
Written Decision on Dismissal of Amendment issued in Corresponding KR Patent Application No. 10-2022-7013412, dated Feb. 29, 2024, along with an English translation thereof.
Office Action issued in Corresponding JP Patent Application No. 2019-206267, dated Oct. 25, 2023, along with an English translation thereof.
Office Action issued in Corresponding JP Patent Application No. 2023-140153, dated Jul. 9, 2024, along with an English translation thereof.
International Search Report issued in Corresponding International Application No. PCT/JP2018/039007, dated Jan. 22, 2019, along with an English translation thereof.
Office Action issued in Corresponding JP Application No. 2018-565072, dated Jan. 11, 2019, along with an English translation thereof.
Written Opinion of the International Searching Authority issued in Corresponding International Application No. PCT/JP2018/039007, dated Jan. 22, 2019.
Brandau, "Ten Tips to Slash Cycles in PET Preform Molding," Plastics Technology, Internet at http://ptonline.com/articles/ten-tips-to-slash-cycles-in-pet-perform-molding. 5 pages.
PCT Third Party Observation issued in Corresponding International Application No. PCT/JP2018/039007, dated Aug. 14, 2019.
PCT Written Opinion issued in Corresponding International Application No. PCT/JP2018/039007, dated Jan. 22, 2019, along with an English translation thereof.
Office Action issued in Corresponding KR Application No. 10-2019-7020655, dated Oct. 4, 2019, along with an English translation thereof.
Office Action issued in Corresponding CN Application No. 201880008105.8, dated Dec. 4, 2019, along with an English translation thereof.
Notification of Reasons for Refusal issued in Corresponding JP Application No. 2019-058668, dated Mar. 10, 2020, along with an English translation thereof.
Notification issued in Corresponding JP Application No. 2019-058668, dated Mar. 17, 2020, along with an English translation thereof.

(56) References Cited

OTHER PUBLICATIONS

Information Offer Form issued in Corresponding JP Application No. 2019-058668, dated Aug. 7, 2020, along with an English translation thereof.
Partial Supplementary European Search Report issued in Corresponding EP Application No. 18869244.6, dated Oct. 23, 2020.
Office Action issued in Corresponding CN Application No. 201880008105.8, dated Jul. 12, 2021.
Biaping Xu, Plastic Extrusion Molding Technology, Beijing: China Light Industry Press, Aug. 2011, p. 213.
Collection in Packaging and Food Machinery, Dec. 2004, vol. 4, p. 23.
"Plastic Blow Molding Technology," edited by Huang Hanxiong, Beijing: Chemical Industry Press, $1^{st}$ edition. Jan. 1995, 4th printing Beijing Jan. 1999, pp. 204-205, along with an English translation thereof.

\* cited by examiner

THIN PREFORM

CORE PART

PF SKIN LAYER

PREFORM HAVING STANDARD THICKNESS

CORE PART

PF SKIN LAYER

METHOD FOR PRODUCING RESIN VESSEL MADE OF RESIN, MOULD UNIT AND MOULDING APPARATUS

CROSS-REFERENCE TO RELATED APPLICATIONS

This is a continuation of U.S. patent application Ser. No. 16/516,128, filed Jul. 18, 2019, which is a continuation of International Pat. Appl. No. PCT/JP2018/039007, filed Oct. 19, 2018, which claims the benefit of Japanese Pat. Appl. No. 2017-202716, filed Oct. 19, 2017. The disclosure of each of the above-mentioned documents, including the specification, drawings, and claims, is incorporated herein by reference in its entirety.

TECHNICAL FIELD

The present invention relates to a method for manufacturing a container made of resin, a mold unit and a molding machine.

BACKGROUND ART

A hot parison blow molding method is a method of performing blow molding by using potential heat upon injection molding of a preform, and can manufacture a variety of containers having better aesthetic appearances, as compared to a cold parison method. A hot parison blow molding machine includes a machine (4-stage type) having a temperature adjustment part provided between an injection molding part and a blow molding part and a machine (2-stage type and 3-stage type) having no temperature adjustment part. When the temperature adjustment part is provided, it is generally easy to adjust a temperature condition of a preform before blow to a condition suitable for shaping of a final container. As regards the hot parison blow molding machine, diverse methods and apparatuses for shortening a molding cycle have been developed. For example, in order to shorten the molding cycle, Patent Literature 1 and Patent Literature 2 disclose shortening times relating to mold opening and closing operations of an injection mold and raising and lowering operations of an extension apparatus, Patent Literature 3 discloses changing a control method for an injection apparatus, and Patent Literature 4 discloses adopting a preform shape which can be demolded at an early stage and an injection molding mold therefor.

CITATION LIST

Patent Literature

Patent Literature 1: JP-A-2005-007797
Patent Literature 2: International Publication No. 2016/148189
Patent Literature 3: International Publication No. 2017/002150
Patent Literature 4: International Publication No. 2017/098673

SUMMARY OF INVENTION

Technical Problem

In recent years, it is desired to further improve productivity of the hot parison blow molding machine, specifically, to further shorten the molding cycle time. In order to shorten the molding cycle time, it is required to shorten the operating time at the machine-side, as disclosed in Patent Literature 1 to Patent Literature 3. However, as disclosed in Patent Literature 4, the vital point is to shorten injection molding time (cooling time) of the preform, which is a rate-controlling step.

However, in Patent Literature 4, it is essential to adopt a special preform shape. Since the preform should be designed to have an optimal shape (thickness distribution) corresponding to a container shape, Patent Literature 4 can cope with only the molding of some containers and cannot be said to have high general versatility. Particularly, the method disclosed in Patent Literature 4 cannot cope with the molding of a cosmetic container (a thick container) advantageous to the hot parison method. Like this, in the hot parison blow molding method, a cycle shortening method having high general versatility, considering diverse molding situations, has not been devised at present.

It is therefore an object of the present invention to provide a method for manufacturing a container made of resin, a mold unit and a molding machine capable of favorably molding a final molded article while shortening a molding cycle.

Solution to Problem

A method for manufacturing a container made of resin of the present disclosure capable of solving the above-described problem:
  an injection molding step of injection molding a bottomed preform made of resin;
  a temperature adjustment step of adjusting a temperature of the preform manufactured in the injection molding step, and
  a blow molding step of blow molding the preform whose temperature has been adjusted to manufacture the container made of resin,
  wherein in the temperature adjustment step,
    the preform is accommodated in a cavity mold,
    an air introduction member is brought into airtight contact with the preform, and
    air is supplied from a blowing port of the air introduction member into the preform, and the air is discharged from a discharge port of the air introduction member to an outside of the preform, so that the preform is in close contact with an inner wall of the cavity mold and is cooled.

According to the above configuration, the preform can be cooled from an inner side thereof in the temperature adjustment step, so that it is possible to favorably mold a final molded article while shortening a molding cycle.

In the method for manufacturing a container made of resin of the present disclosure, it is preferable that:
  a temperature adjusting medium flows in the cavity mold,
  in the temperature adjustment step, the preform is temperature-adjusted from an outer side by the close contact with the cavity mold, and
  the preform is cooled from an inner side by convection of the air from the air introduction member.

According to the above configuration, a cooling degree is set relatively different at the inner and outer sides of the preform, so that the temperature adjustment and the cooling can be performed in a compatible manner. Therefore, it is possible to favorably mold the final molded article while further effectively shortening the molding cycle.

Also, a method for manufacturing a container made of resin of the present disclosure capable of solving the above-described problem includes:

an injection molding step of injection molding a bottomed preform made of resin;
a temperature adjustment step of adjusting a temperature of the preform manufactured in the injection molding step, and
a blow molding step of blow molding the preform whose temperature has been adjusted to manufacture the container made of resin,
wherein in the injection molding step,
    a resin material is injected into a space having a shape of the preform, the space being formed by mold-clamping, an injection molding mold,
    the resin material is cooled inside the space after the injection of the resin material has been completed, and
a time during which the resin material is cooled in the space after the injection of the resin material has been completed is half or less of a time for which the resin material is injected.

According to the above configuration, since it is possible to shorten the cooling time in the injection molding step, it is possible to shorten an injection molding time of the preform in an injection molding part, so that it is possible to shorten a molding cycle time of the container.

Also, a mold unit of the present disclosure capable of solving the above-described object is used for a temperature adjustment step of a preform, the mold unit including:

a cavity mold configured to accommodate therein a bottomed preform made of resin, and
an air introduction member configured to be in airtight contact with the preform and to supply air into the preform,
wherein the air introduction member has:
    a blowing port through which the air is to be supplied to an inside of the preform, and
    a discharge port through which the air is to be discharged to an outside of the preform.

According to the above configuration, the preform can be cooled from an inner side thereof in the temperature adjustment step, so that it is possible to favorably mold a final molded article while shortening a molding cycle.

In the mold unit of the present disclosure, it is preferable that the cavity mold has a fixed-type structure and is not a split mold.

Also, a molding machine of the present disclosure capable of solving the above-described problem includes:

an injection molding part;
a temperature adjustment part; and
a blow molding part,
wherein the temperature adjustment part includes the above-described mold unit.

Also, a method for manufacturing a container made of resin capable of solving the above-described problem includes:

an injection molding step of injection molding a bottomed preform made of resin;
a temperature adjustment step of adjusting a temperature of the preform manufactured in the injection molding step, and
a blow molding step of blow molding the preform whose temperature has been adjusted to manufacture the container made of resin,
wherein the preform has a thickness equal to larger than 2.0 mm and equal to or smaller than 10.0 mm,
wherein an area ratio of a sectional area of the container including a vertical center line of the container to a sectional area of the preform including a vertical center line of the preform is equal to or larger than 1.2 times and equal to or smaller than 10.0 times, and
wherein, in the temperature adjustment step, the preform is cooled from an inner side thereof.

Advantageous Effects of Invention

According to the present invention, it is possible to provide the method for manufacturing a container made of resin, the mold unit and the molding machine capable of favorably molding the final molded article while shortening the molding cycle.

DESCRIPTION OF EMBODIMENTS

First Exemplary Embodiment

Figure 1:
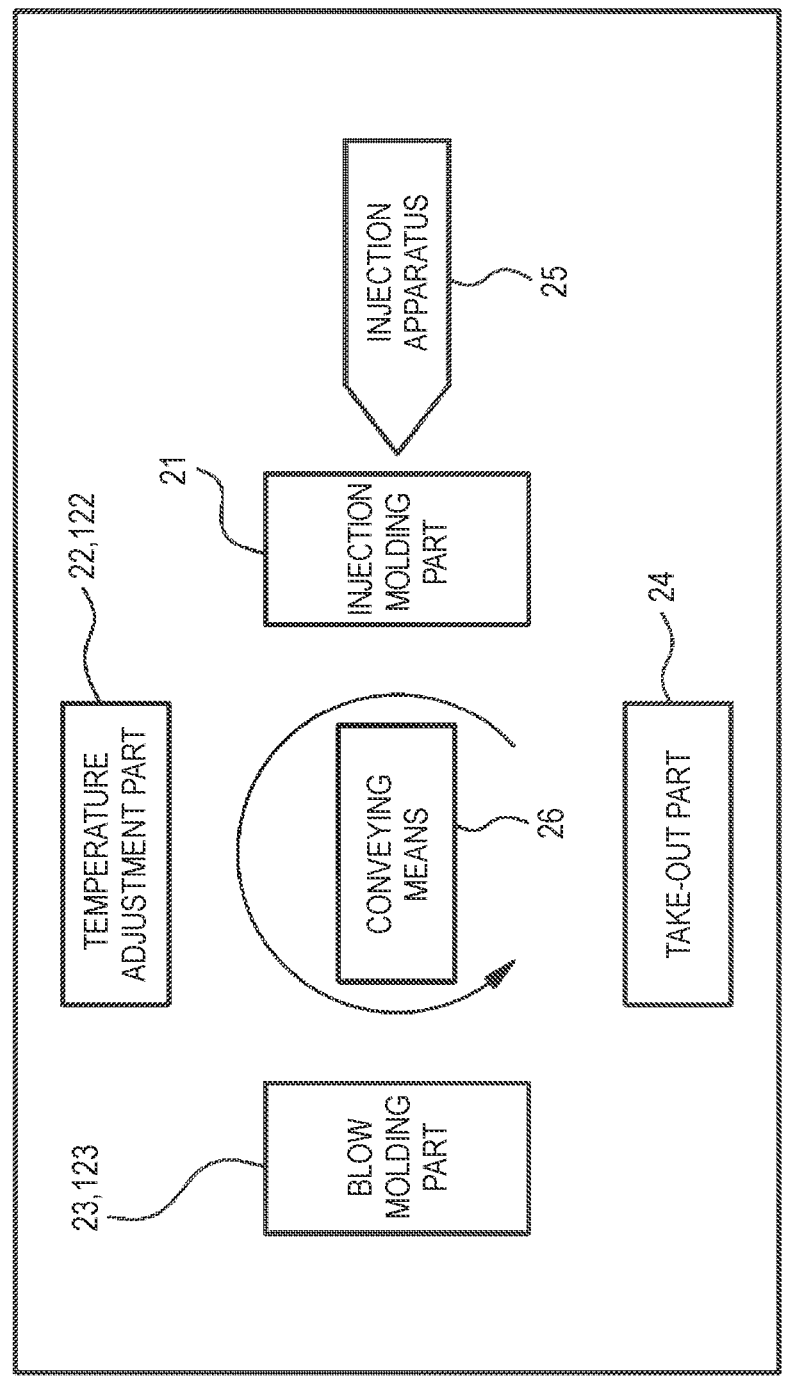
FIG. 1 is a block diagram of a molding machine.

Hereinafter, an example (a first exemplary embodiment) of an exemplary embodiment of the present invention will be described with reference to the drawings. In the meantime, dimensions of respective members shown in the drawings may be different from actual dimensions of respective members, for description sake. First, a molding machine 20 for manufacturing a container 10 made of resin is described with reference to FIG. 1. FIG. 1 is a block diagram of the molding machine 20.

As shown in FIG. 1, the molding machine 20 includes an injection molding part 21 for manufacturing a preform 11, and a temperature adjustment part 22 for adjusting a temperature of the manufactured preform 11. The injection molding part 21 is connected with an injection apparatus 25 configured to supply a resin material that is a raw material. Also, the molding machine 20 includes a blow molding part (an example of the blow apparatus) 23 for blowing the preform 11 to manufacture a container 10, and a take-out part 24 for taking out the manufactured container 10.

Figure 2:
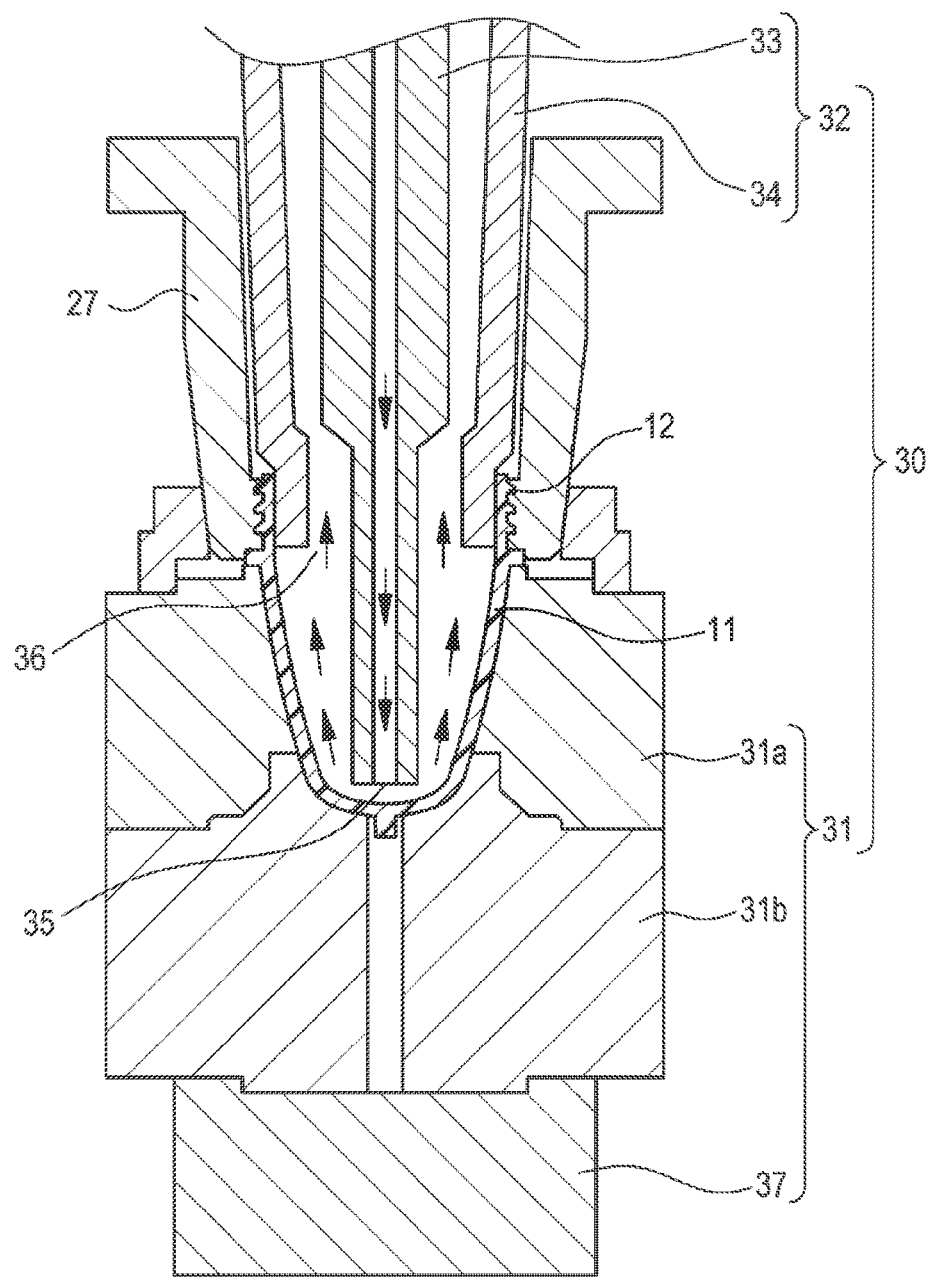
FIG. 2 is a pictorial sectional view depicting an aspect (a blowing direction of air of cooling blow) of adjusting a temperature of a preform in a temperature adjustment part of a first exemplary embodiment.

The injection molding part 21, the temperature adjustment part 22, the blow molding part 23 and the take-out part 24 are provided at positions spaced by predetermined angles (90°, in the first exemplary embodiment) about a conveying means 26. The conveying means 26 is configured by a rotating plate and the like. As shown in FIGS. 2 and 3, the preform 11 or the container 10 of which a neck part 12 is supported by a neck mold 27 attached to the rotating plate is conveyed to each part in association with rotation of the rotating plate.

The injection molding part 21 shown in FIG. 1 includes an injection cavity mold, an injection core mold, a neck mold and the like, which are not shown. A synthetic resin material such as polyester-based resin (for example, polyethylene terephthalate (PET)) is supplied from the injection apparatus 25 into a preform-shaped space, which is formed by mold-clamping the molds, so that a bottomed preform 11 is manufactured. The preform 11 has an optimal thickness distribution (shape), in correspondence to the container 10, and a thickness (average thickness) of a body part thereof is set to 1.0 to 5.0 mm, preferably 1.5 to 3.0 mm, for example.

The temperature adjustment part 22 is configured to adjust a temperature of the preform manufactured in the injection molding part 21 to a temperature suitable for final blowing.

Here, the temperature adjustment part 22 is described in detail with reference to FIG. 2. As shown in FIG. 2, the temperature adjustment part 22 includes a mold unit 30 provided to perform temperature adjustment blowing and including a cavity mold (a cavity mold for temperature adjustment) 31 configured to accommodate therein the preform 11 and a first air introduction member 32 configured to be in airtight contact with the preform 11 and to supply air into the preform 11. The cavity mold 31 has a fixed-type (single unit-type) structure where a space having substantially the same shape as the preform 11 manufactured in the injection molding part 21 is defined, and is not operable and closable split molds. The cavity mold 31 has a configuration split into two upper and lower stages, and includes an upper mold 31a and a lower mold 31b. In the meantime, the cavity mold 31 shown in FIG. 2 includes a support stand 37 provided at a lower part of the lower mold 31b. A temperature adjusting medium (cooling medium) flows in each of the upper mold 31a and the lower mold 31b, so that a temperature thereof is kept low. Although a temperature of the temperature adjusting medium flowing in each of the upper mold 31a and the lower mold 31b is not particularly limited, the temperature may be appropriately set within a range of 5° C. to 80° C. preferably, 30° C. to 60° C., for example. In the meantime, in conformity to a size and a shape of the preform 11, a three-stage configuration may also be possible in which the lower mold 31b of the cavity mold 31 shown in FIG. 2 is configured as an intermediate mold, the support stand 37 is formed with a cavity corresponding to the preform and is configured as a lower mold, and the temperature adjusting medium (cooling medium) flows therein.

The first air introduction member 32 includes a hollow first rod member 33 having an air flowing hole formed therein and a first fitting core (first blow core member) 34. The first rod member 33 is accommodated to be vertically moveable in the first fitting core 34. A tip end of the first rod member 33 is formed with a first inner flowing port 35 through which the air can be ejected or sucked. A temperature of the air is appropriately set within a range of about 0° C. to about 20° C. (room temperature), for example, in correspondence to a thickness of the preform 11 or the container 10. When the first air introduction member 32 is inserted into (is brought into airtight contact with) the preform 11, the first fitting core 34 is fitted (is in close contact) with the neck part 12. Thereby, it is possible to prevent the air in the preform 11 from being leaked from the neck part 12 to an outside of the first fitting core 34. A gap between the first rod member 33 and the first fitting core 34 is an air flowing path for supplying and discharging the air with respect to the preform 11. A gap formed by a tip end of the first fitting core 34 and the first rod member 33 configures a first outer flowing port 36 through which the air can be ejected or sucked. The first inner flowing port 35 and the first outer flowing port 36 may be a blowing port and a discharge port, respectively.

Figure 3B:
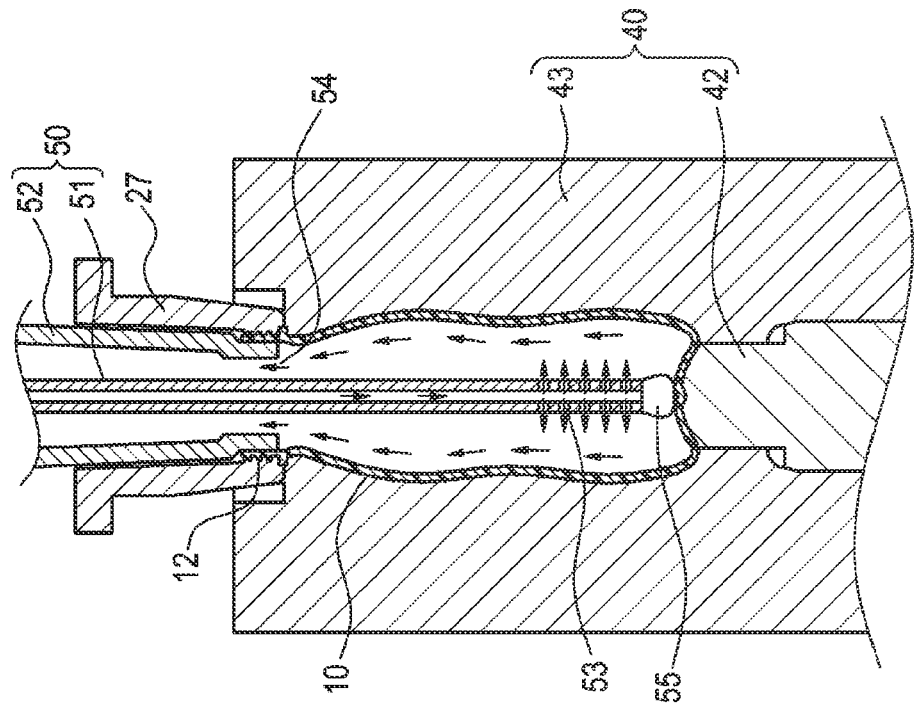
FIG. 3A-B are pictorial sectional views depicting an aspect of blow molding by which a container is manufactured from the preform in a blow molding part of the first exemplary embodiment.
Figure 3A:
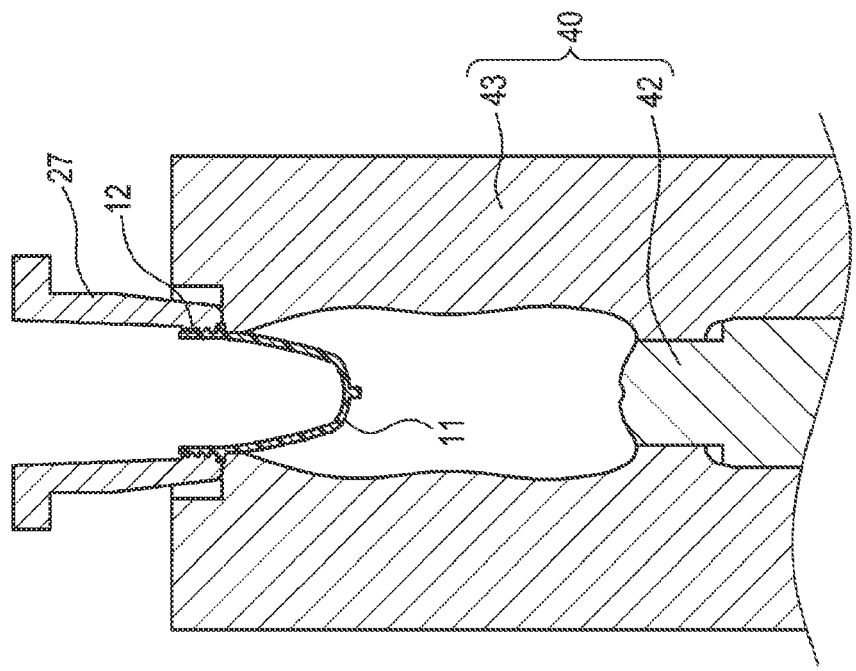

Subsequently, the blow molding part 23 is described with reference to FIGS. 3A-B. As shown in FIGS. 3A-B, the blow molding part 23 includes a mold 40 and a second air introduction member 50. The mold (blow mold) 40 includes a bottom mold 42 and a pair of openable and closable split molds (cavity molds for blow molding) 43. The bottom mold 42 and the split molds 43 are mold-clamped, so that shapes of side surfaces and a bottom surface of the container 10 are defined. The bottom mold 42 is disposed at a center below a molding space of the split molds 43.

The second air introduction member 50 of the blow molding part 23 includes a second rod member 51 and a second fitting core (second blow core member) 52. The second rod member 51 is accommodated to be vertically moveable in the second fitting core 52. The second rod member 51 is a stretching rod, and a tip end thereof is provided with a contact part 55 configured to contact an inner bottom surface of the preform 11 and to prevent center deviation upon extension. An outer peripheral surface of the second rod member 51 is formed with second inner flowing ports 53 through which the air can be ejected or sucked. When the second air introduction member 50 is inserted into (is brought into airtight contact with) the preform 11, the second fitting core 52 is fitted (is in close contact) with the neck part 12. Thereby, it is possible to prevent the air in the preform 11 from being leaked from the neck part 12 to an outside of the second fitting core 52. A gap between the second rod member 51 and the second fitting core 52 is a flowing path for supplying and discharging the air with respect to the preform 11. A gap formed by a tip end of the second fitting core 52 and the second rod member 51 configures a second outer flowing port 54 through which the air can be ejected or sucked.

The second air introduction member 50 is configured to supply the air from the second outer flowing port 54 into the preform 11 and to discharge the air from the second inner flowing port 53 to an outside of the preform 11. The second inner flowing port 53 and the second outer flowing port 54 may be a blowing port and a discharge port, respectively.

Figure 4:
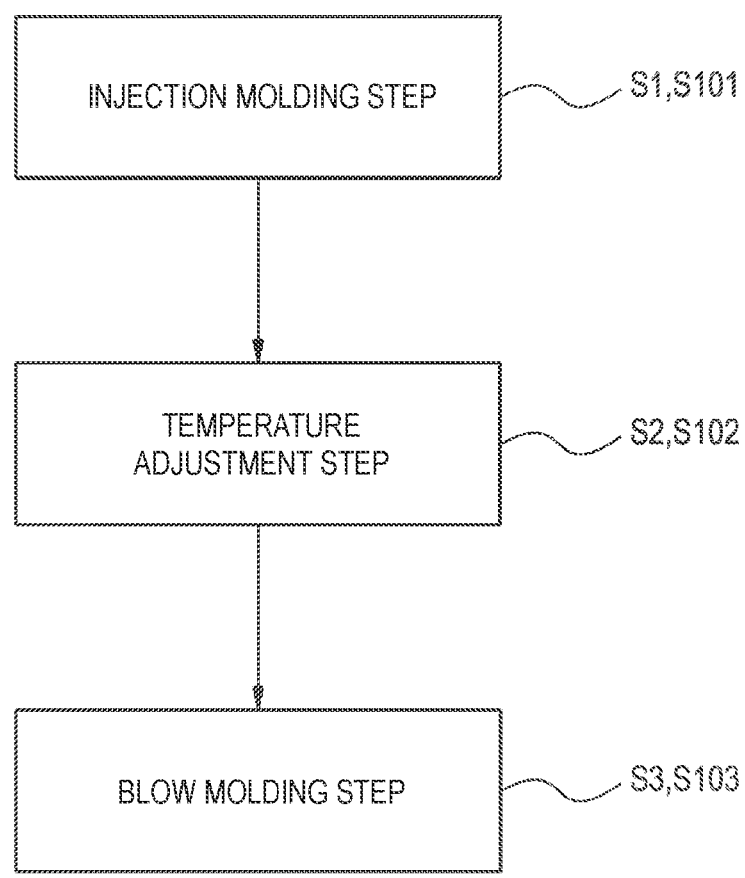
FIG. 4 is a flowchart of a method for manufacturing a container made of resin.

Subsequently, a method for manufacturing the container 10 in accordance with the first exemplary embodiment is described. FIG. 4 is a flowchart of a method for manufacturing a container made of resin. The container 10 of the first exemplary embodiment is manufactured. through an injection molding step S1 of injection molding the preform 11, a temperature adjustment step S2 of adjusting a temperature of the preform 11, and a blow molding step S3 of blow molding the preform 11 whose temperature has been adjusted to manufacture the container 10, and the container 10 is taken-out by releasing the neck part 12 from the neck mold 27.

First, the injection molding step S1 is described. In the injection molding step S1, the preform 11 is manufactured by supplying a resin material from the injection apparatus 25 into the preform-shaped space which is formed by mold-clamping the injection cavity mold, the injection core mold, the neck mold and the like. The preform 11 is moved from the injection molding part 21 to the temperature adjustment part 22 immediately after the resin filling step is over or after a cooling step for a predetermined time (minimum time) after the resin filling step.

Figure 5A:
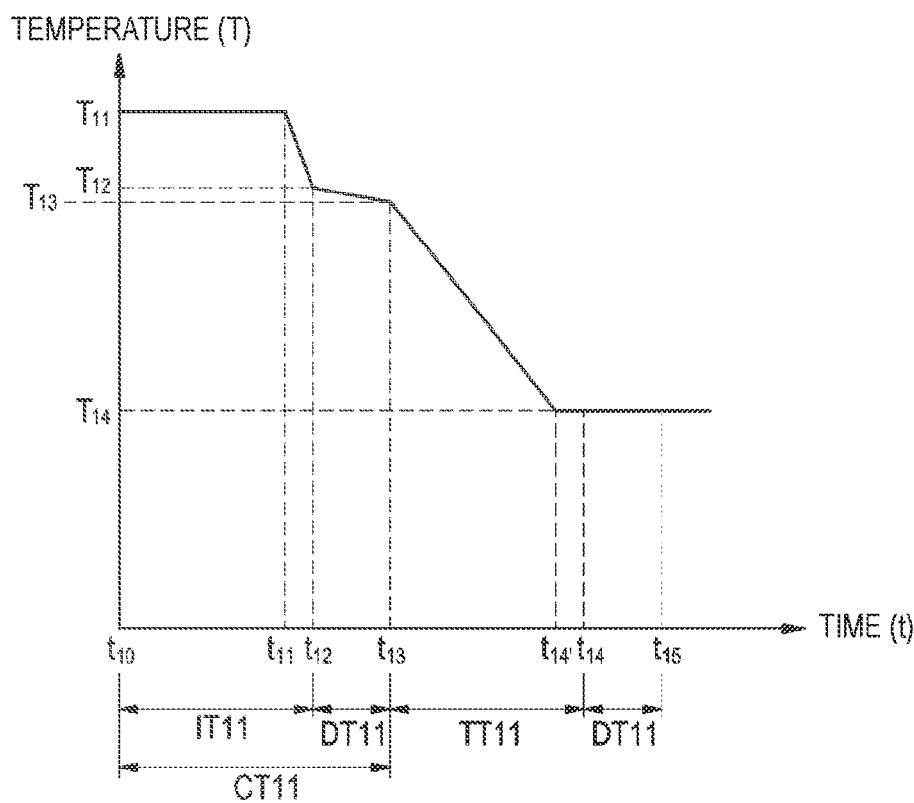
FIG. 5A depicts a change in temperature of a preform over time in the first exemplary embodiment.

In the injection molding step S1, the resin material is injected into the preform-shaped space from a starting time t10 (time at which injection of the resin material starts) to a first time t11 (FIG. 5A). From the first time t11 (time at which the supply of the resin material is completed) to a second time t12, the preform 11 is cooled from a first temperature T11 to a second temperature T12 (FIG. 5A). The first temperature T11 is a temperature equal to or higher than a melting point of the resin material, and is, for example, 270° C. to 300° C., in a case of PET resin. The time ranging from the starting time t10 to the first time t11 is a filling time (injection time), the time ranging from the first time t11 to the second time t12 is a cooling time, and the time ranging from the starting time t10 to the second time t12 is an injection molding time IT11 (filling time (including pressure holding time)+cooling time), Also, from the second time t12 to a third time t13 (start time of the temperature adjustment step S2), the preform 11 is cooled from the second temperature T12 to a third temperature T13 (FIG. 5A). The time ranging from the second time t12 to the third time t13 is a conveying time DT11 of the preform 11 or the container 10 between the respective steps, and indicates time for which the preform 11 is conveyed from the injection molding part 21 to the temperature adjustment part 22, in FIGS. 5A-B. In the meantime, due to the structure of the molding machine 20, the conveying time DT11 between the steps is all the same. A sum of the injection molding time IT11 and the conveying time DT11 is a molding cycle time CT11.

The time (time ranging from first time t11 to second time t12) during which the resin material is cooled after the injection of the resin material is completed is preferably half or less of a time (time ranging from starting time t10 to first time t11) during which the resin material is injected. In correspondence to a weight of the resin material, the time during which the resin material is cooled in the injection molding step can be shortened, as compared to the time during which the resin material is injected. The time during which the resin material is cooled is preferably ⅓ or less of the time during which the resin material is injected, more preferably ¼ or less, and particularly preferably ⅕ or less.

Subsequently, the temperature adjustment step S2 is described with reference to FIG. 2. First, the preform 11 is accommodated in the preform-shaped space of the cavity mold 31. Then, the first air introduction member 32 is inserted into (is brought into airtight contact with) the preform 11 accommodated in the cavity mold 31. Then, preliminary blow of supplying the air into the preform 11 from the first outer flowing port 36 of the first air introduction member 32 with the first inner flowing port 35 being closed and bringing the preform 11 into close contact with the inner wall of the cavity mold 31 is performed. Then, cooling blow of opening the first inner flowing port 35, introducing the air from the first inner flowing port 35, and discharging the air to the outside of the preform 11 through the first outer flowing port 36 is performed (FIG. 2). Like this, the flowing directions of the air in the preliminary blow and the cooling blow are preferably set to be opposite to each other. At this time, since the air is continuously ejected from the first inner flowing port 35, the preform 11 is cooled from an inner side by convection of the air flowing therein. Also, since the preform 11 is in continuous contact with the cavity mold 31, the temperature thereof is adjusted from an outer side so as not to become equal to or lower than a temperature suitable for blow molding, and the temperature deviation caused upon the injection molding is also reduced. In the meantime, since the cavity mold 31 has the preform-shaped space, the shape of the preform 11 does not largely change. After the cooling for a predetermined time, the cooled preform 11 is moved to the blow molding part 23.

Figure 6:
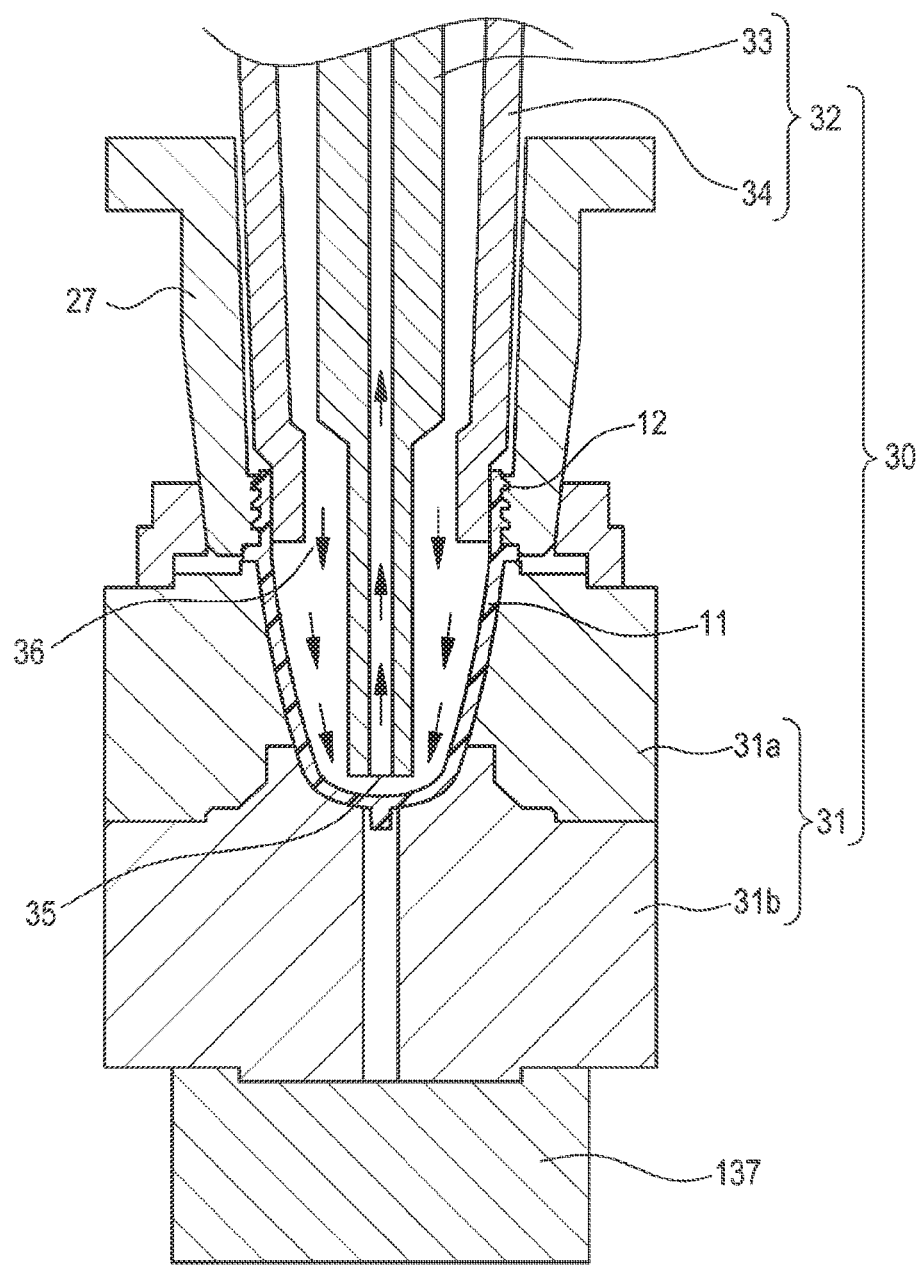
FIG. 6 is a pictorial sectional view depicting an aspect (a blowing direction of air of cooling blow) of a modified embodiment of the temperature adjustment of the preform in the temperature adjustment part of the first exemplary embodiment.

In the meantime, the flowing direction of the air of the first air introduction member 32 can be appropriately changed. For example, as shown in FIG. 6, during the cooling blow, the air may be sent from the first outer flowing port 36 and may be discharged from the first inner flowing port 35. In this case, during the preliminary blow, the air is preferably sent from the first inner flowing port 35 into the preform 11 with the first outer flowing port 36 being closed. When it is desired to increase cooling strength of a lower side (bottom part side) of the preform 11, the air is caused to flow from the first inner flowing port 35 toward the first outer flowing port 36. When it is desired to increase cooling strength of an upper side (body part side) of the preform 11, the air is caused to flow from the first outer flowing port 36 toward the first inner flowing port 35. In the meantime, when it is desired to strongly cool a specific part of the preform 11 and to increase a thickness of a specific part of the container 10, for example, the blowing directions of the air in the preliminary blow and the cooling blow may be set to be the same.

Figure 5B:
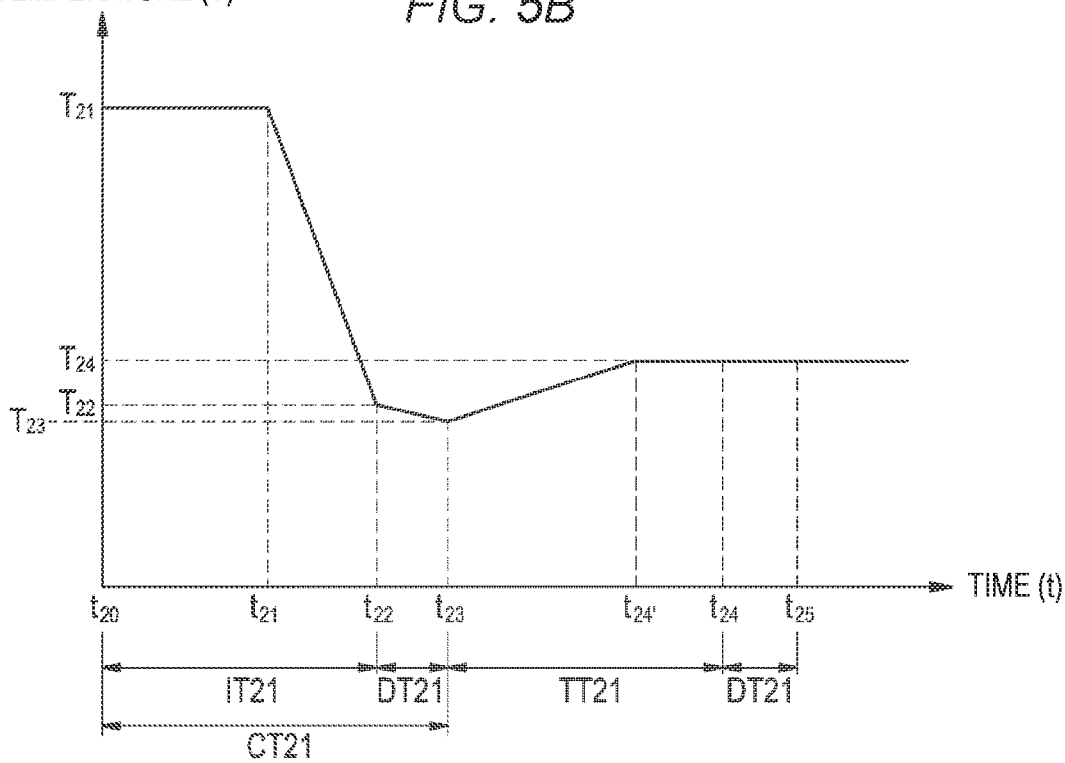
FIG. 5B depicts a change in temperature of a preform over time in a reference example.

Here, a change in temperature of the preform over time is described with reference to FIGS. 5A-B. In the temperature adjustment step S2, from the third time t13 to a fourth intermediate time t14', the preform 11 is cooled from the third temperature T13 to a fourth temperature T14, and the temperature of the preform 11 is then kept at the fourth temperature T14 up to a fourth time t14 (FIG. 5A). The fourth temperature T14 is a temperature suitable for blow, and is, for example, 90° C. to 105° C., in the case of the PET resin. The time ranging from the third time t13 to the fourth time t14 is temperature adjustment time TT11. Also, the fourth temperature T14 indicates an optimal blow temperature of the preform. From the fourth intermediate time t14' to the fourth time t14, the temperature adjustment in the temperature adjustment step S2 is continuously performed until the molding (cooling) of the preform 11 in the injection molding step S1 is completed. In the meantime, in a case where the time to reach the fourth temperature T14 is short, the cooling blow may be stopped at the fourth intermediate time t14'. In the meantime, the fourth temperature T14 is preferably set to temperatures of 90° C. to 95° C. because a stretching alignment property of the preform 11 is favorable and the strength (physical property) of the container 10 can be increased when the temperature is low.

Subsequently, the blow molding step S3 is described with reference to FIGS. 3A-B. First, the preform 11 is accommodated in the mold 40 where the bottom mold 42 is stationary and the split molds 43 are opened. Then, the split molds 43 are closed (FIG. 3A) and the second air introduction member 50 is inserted (is brought into airtight contact). At this time, in FIGS. 3A-B, the preform 11 is stretched downward by the second rod member 51. Then, the preform 11 is bulged into a shape of the container 10 by final blow of supplying the air from the second outer flowing port 54 into the preform 11, so that the container 10 is manufactured (FIG. 3B). When the cooling is not sufficient only by the contact between the mold 40 and the preform 11, the cooling blow of supplying the air from the second inner flowing port 53 into the preform 11 and discharging the air from the second outer flowing port 54 to the outside of the preform may be performed after the final blow. After the final blow is completed, the split molds 43 are opened to release the container 10 from the mold 40.

The container 10 removed from the mold 40 is moved to the take-out part 24 (FIG. 1), and the neck part 12 is released from the neck mold 27 to take-out the container 10. By the above method, the container 10 is manufactured.

In the meantime, when molding the hot pad son preform 11 with a crystalline thermoplastic resin (a resin that can be in a transparent amorphous state or a white-clouded crystalline state), it may be whitened due to insufficient cooling, depending on materials. For example, when PET (polyethylene terephthalate) is used as the material, if the material is slowly cooled (for example, cooling at room temperatures for tens of seconds) in a temperature range in which crystallization is promoted (from 120° C. to 200° C.), the material is crystallized by formation of spherical crystals and tends to be whitened (white-clouded). For this reason, in the related art, the injection mold (the injection cavity mold, the injection core mold and the neck mold) is rapidly cooled (for example, cooling at 10° C. for 5 seconds) so as to rapidly pass the crystallization temperature range, so that the sufficient cooling is performed in the injection molding step and the crystallization (whitening) of the PET preform 11 is thus suppressed. That is, as shown in FIG. 5B, according to a related-art method for manufacturing a container made of resin, in the injection molding step, from a first time t21 to a second time t22, the preform is cooled from a first temperature T21 to a second temperature T22 lower than or substantially equal to a fourth temperature T24 (a temperature suitable for blow molding, for example 90° C. to 105° C.). Then, in the temperature adjustment step, from a third time t23 to a fourth intermediate time t24', the temperature of the preform 11 is increased from a third temperature T23 to the fourth temperature T24, and is then kept at the fourth temperature T24 up to a fourth time t24 (FIG. 5B). For this reason, the cooling time in the injection molding step is prolonged, so that molding cycle time CT21 of the container is prolonged. Also, when molding a thick container, more time is required to cool the preform, so that the molding cycle time CT21 of the container is further prolonged (FIG. 5B). Also, when special PET resin modified so that it is difficult to be crystallized (copolyester:copolymer) is used, it is possible to manufacture a preform or container of which whitening is suppressed while shortening a little the cooling time of the preform 11 in the injection molding part. However, the special PET resin is very expensive, as compared to a general-purpose (usual) PET resin, and is not favorable to mass production of a general-purpose container.

According to the method for manufacturing the container 10 made of resin in accordance with the first exemplary embodiment, the cooling step of the preform 11 is mostly omitted in the injection molding step S1, and the preform 11 is cooled in the temperature adjustment step S2. In the temperature adjustment step S2, the preform 11 is brought into close contact with the cavity mold 31 and an outer surface of the preform 11 can be effectively temperature-adjusted. Also, since the air continuously flows to generate the convention without being confined in the preform 11, an inner surface of the preform 11 can be cooled at the same time. Since the temperature adjustment and cooling of the preform 11 can be performed in the temperature adjustment step S2, it is possible to demold the preform 11 even at high temperatures in the injection molding step S1, so that it is possible to quickly start molding of a next preform 11. That is, it is possible to favorably mold a final molded article while shortening the molding cycle time CT11. Also, even when the general-purpose PET resin is used without using the special PET resin, it is possible to mold a container, which has not undergone whitening, with a short molding cycle.

Figure 7A:
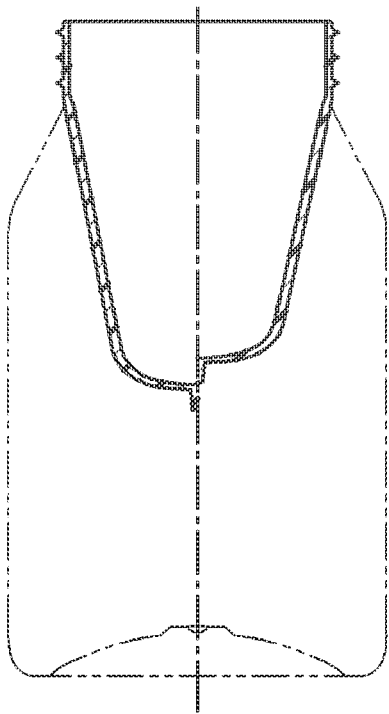
FIG. 7A compares a preform that is favorably used in an exemplary embodiment and a preform in a reference example, depicted by two preforms (a left preform has a thin thickness and a right preform has a usual thickness) and containers to be blow-molded from the preforms.
Figure 7B:
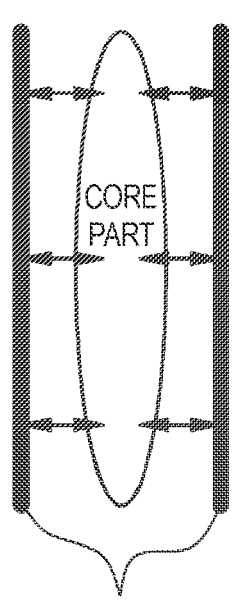
FIG. 7B compares a preform that is favorably used in an exemplary embodiment and a preform in a reference example depicted by heat exchanges in preforms having different thicknesses.
Figure 7B:
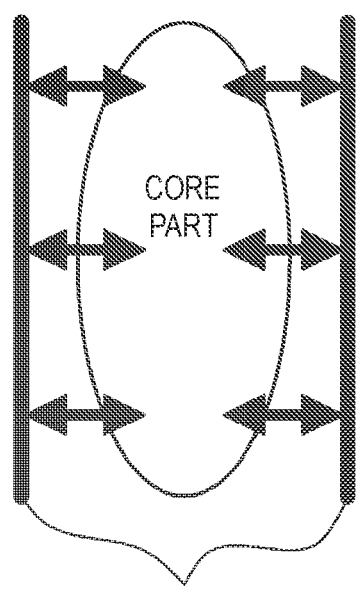

Meanwhile, in Patent Literature 4, the body part of the preform is designed to be thin so as to be able to perform early demolding in the injection molding step. This is effective as a scheme for shortening a molding cycle in a blow molding machine in which the temperature adjustment step is not carried out. However, when the preform shape is made thin, a physical property and an outer appearance of the container 10 may be deteriorated. Here, a case where containers having the same shape are manufactured from preforms of which weights are the same and body parts have different thicknesses is described. FIG. 7A shows two preforms whose weight are 40 g (a left preform has a thin thickness and a right preform has a usual thickness) and outer shapes (dashed-two dotted line) of containers to be blow molded from the respective preforms. The preform having a thin thickness is longer in a longitudinal direction as the body part is made thin (refer to the left in FIG. 7A). As a result, a stretching ratio of the thin preform in the longitudinal direction is smaller than the usual thick preform. In general, the greater the stretching ratio (a degree of oriented stretching) is, the higher the strength (shock strength against drop and the like, a degree of stiffness, tensile strength, and the like) and the barrier property of the container is. That is, the physical properties of the container molded from the thin preform are lower than the container molded from the usual thick preform. Also, when the stretching ratio decreases, it is difficult to adjust a thickness of the container, and a degree of thickness deviation and an outer appearance of the container are likely to be deteriorated. The thin preform (refer to the left in FIG. 7A) is inferior to the usual thick preform (refer to the right in FIG. 7A), in terms of temperature uniformity of the preform, too. FIG. 7B depicts heat exchanges in preforms having different thicknesses. Since a heat quantity of an inner layer part (core part) of the thin preform is smaller than that of the usual thick preform, a degree of heat transfer (heat exchange) with respect to a surface layer (skin layer) having a lower temperature is lowered. As a result, it is difficult to make the temperature of the thin preform uniform, as compared to the usual thick preform, so that the thickness deviation degree of the container is likely to increase.

In contrast, in the first exemplary embodiment, since it is possible to effectively cool the preform 11 in the temperature adjustment part 22, even when the preform designed to have an optimal thickness distribution in conformity to the container shape is used, it is possible to shorten the molding cycle time CT11, unlike Patent Literature 4. Also, there are no concerns that the physical properties of the container will be lowered or whitening will occur, and the general versatility is high.

In the meantime, the body part of the preform 11 that is used in the present invention is preferably designed to have an average thickness equal to or larger than 2.0 mm and equal to or smaller than 10.0 mm (preferably equal to or larger than 2.0 mm and equal to or smaller than 5.0 mm). Also, a longitudinal stretching ratio of the container 10 to the preform 11 is preferably set to be equal to or larger than 1.1 times and equal to or smaller than 4.0 times (preferably, equal to or larger than 1.1 times and equal to or smaller than 1.2 times or equal to or larger than 1.9 times and equal to or smaller than 4.0 times), and a transverse stretching ratio of the container 10 to the preform 11 is preferably set to be equal to or larger than 1.1 times and equal to or smaller than 4.0 times (preferably, equal to or larger than 1.1 times to equal to or smaller than 1.8 times or equal to or larger than 3.0 times and equal to or smaller than 4.0 times), Also, an area ratio (an area ratio of longitudinal sections) of a sectional area of the container 10 including a vertical center line to a sectional area of the preform 11 including a vertical center line is preferably set to be equal to or larger than 1.2 times and equal to or smaller than 16.0 times (preferably, equal to or larger than 1.2 times and equal to or smaller than 10.0 times). In particular, more preferably, the longitudinal stretching ratio is set to approximately 2.5 times, the transverse stretching ratio is set to approximately 4.0 times, and the area ratio is set to approximately 10.0 times. The molding conditions of the preform 11 are set in this way, so that it is possible to mold the preform 11 with the general-purpose (usual) PET resin and to implement the temperature adjusting method, thereby favorably manufacturing the container 10 having high strength (physical property) and having suppressed whitening (white cloudiness).

Examples of First Exemplary Embodiment

In the below, examples of the first exemplary embodiment are described. In the meantime, the technical scope of the present invention is not limited to the examples. The technical scope of the present invention is defined by the claims and equivalents thereof.

The manufacturing tests of the PET containers of Example 1, Example 2 and Example 3 were carried out using the molding machine 20 having the configuration described in the first exemplary embodiment. In the respective examples, the thickness of the preform (average thickness of the body part), the cycle time, the weight of the container and the content of the container are shown in Table 1. In the respective examples, time to inject the resin material in the injection molding step, time to cool the preform in the mold after the injection is completed, and a chiller temperature (temperature of the cooling medium (chiller water)) in the injection cavity mold of the injection molding part are shown in Table 1. In the respective examples, time to blow the preform in the temperature adjustment step, and temperatures of the upper stage temperature adjustment POT, the intermediate stage temperature adjustment POT and the lower stage temperature adjustment POT of the cavity mold are shown in Table 1. In the meantime, in Example 1, the two-stage cavity mold without the intermediate stage temperature adjustment POT was used, and in Example 2 and Example 3, the three-stage cavity mold was used.

TABLE 1

| | | Example 1 | Example 2 | Example 3 |
|---|---|---|---|---|
| Thickness of preform (mm) | | 2.15 | 2.4 | 4.2 |
| Cycle time (sec) | | 5.6 | 7.45 | 15.0 |
| Weight (g) | | 11.4 | 40.5 | 73 |
| Content (mL) | | 180 | 900 | 750 |
| Injection molding step | Injection time (sec) | 2.1 | 3.6 | 9.2 |
| | Cooling time (sec) | 0.9 | 0.9 | 1.8 |
| | Chiller temperature (° C.) | 10 | 5 | 15 |
| Temperature adjustment step | Preliminary blow time (sec) | 0.0 | 0.5 | 1.0 |
| | Cooling blow time (sec) | 2.0 | 4.0 | 10.0 |
| | upper stage temperature adjustment POT (° C.) | 30 | 45 | 52 |
| | intermediate stage temperature adjustment POT (° C.) | — | 30 | 36 |
| | lower stage temperature adjustment POT (° C.) | 30 | 70 | 30 |
| Whitening of preform | | No occurrence | No occurrence | No occurrence |
| Shortening ratio of cycle (%) | | 24.3 | 13 | 37.5 |

In the manufacturing tests of Example 1, Example 2 and Example 3, the preform has not undergone whitening, and the container having a favorable shape could be manufactured. Also, as compared to a case where the cooling was performed in the injection molding step so that whitening does not occur in the preform, under the condition that no cooling was performed by the preliminary blow and the cooling blow in the temperature adjustment step, the cycle time could be shortened by 24.3% in Example 1, by 13.0% in Example 2 and by 37.5% in Example 3. When the preform has great thickness and weight, the cooling time in the injection molding step is prolonged. Regarding this, in Example 3, the cycle time could be particularly shortened.

Second Exemplary Embodiment

Subsequently, another example (second exemplary embodiment) of the exemplary embodiment of the present invention is described with reference to FIGS. 1, 4 and 8 to 10. A molding machine 120 (FIG. 1) in accordance with the second exemplary embodiment is the same as or similar to the molding machine 20 in accordance with the first exemplary embodiment, except a configuration of a cavity mold 131 of a mold unit 130 of a temperature adjustment part 122 and configurations of a mold 140 and a second air introduction member 150 of a blow molding part 123. Therefore, the same or similar configurations are denoted with the same reference numerals, and the descriptions thereof are omitted. In the below, only the temperature adjustment part 122 and the blow molding part 123, which are different from the first exemplary embodiment, are described.

First, the temperature adjustment part 122 is described in detail with reference to FIGS. 8A-D. FIGS. 8A-D is a pictorial sectional view depicting an aspect of adjusting a temperature of the preform 11 in the temperature adjustment part 122, and the aspect is depicted by (a) to (d). The respective steps of FIGS. 8A-D will be described in detail later. The temperature adjustment part 122 is provided to perform temperature adjustment blow and includes a mold unit 130 having a cavity mold 131 configured to accommodate therein the preform 11, and the first air introduction member 32. The cavity mold 131 is a split mold configured to define a space greater than the preform 11 manufactured in the injection molding part 21. In the cavity mold 131, a temperature adjusting medium (cooling medium) flows, so that a temperature is kept low. Although the temperature of the temperature adjusting medium (cooling medium) is not particularly limited, it can be appropriately selected within a range from 5° C. to 80° C., preferably from 5° C. to 30° C., and more preferably 10° C.±5° C. The configuration of the first air introduction member 32 is the same as the first exemplary embodiment.

Subsequently, the blow molding part 123 is described in detail with reference to FIGS. 9A-D. FIGS. 9A-D are pictorial sectional view depicting a blow molding aspect of manufacturing the container 10 from the preform 11 in the blow molding part 123 and the aspect is depicted by (a) to (d). The respective steps of of FIGS. 9A-D will be described in detail later. A mold (blow mold unit) 140 of the blow molding part 123 includes a shoulder mold 141, a bottom mold 142, and a base mold (body part mold) 143. The bottom mold 142 and the base mold 143 are coupled to each other to define side surfaces and a bottom surface of the container 10. The bottom mold 142 and the base mold 143 are coupled at lower end portions to a second fixing plate 145. The base mold 143 is configured as a mold of a single structure having a substantially cylindrical molding space, rather than a split mold, and is configured to be vertically movable in FIGS. 9A-D. Also, an inner wall surface of the molding space of the base mold 143 has a tapered shape of which a diameter of an upper space is greater than a diameter of a lower space. The shoulder mold 141 is configured by a pair of split molds, each of which is coupled at any one left and right end portions to the first fixing plate 144, in FIGS. 9A-D. The first fixing plate 144 is coupled to a mold opening and closing mechanism (not shown), and the shoulder mold 141 is configured to be movable in a left and right direction in FIGS. 9A-D. The shoulder mold 141 is fitted to the neck mold 27 in a closed state, so that it is in contact with or comes close to a shoulder of the preform 11, thereby defining an outer shape of a shoulder of the container 10. Also, pressure receiving members (not shown) are arranged at both sides (a front side and an inner side of the drawing sheet, in FIGS. 9A-D) of the shoulder mold 141, and are respectively coupled to the first fixing plate 144.

The second air introduction member 150 of the blow molding part 23 is the same as the first exemplary embodiment, except a second rod member 151. The second rod member 151 is the same as the first exemplary embodiment, in that it has an air flowing hole formed therein. However, a tip end of the second rod member is not provided with a contact part configured to be in contact with the inner bottom surface of the preform 11, and is instead provided with a second inner flowing port 153 through which the air can be ejected or sucked.

The molding machine 120 of the second exemplary embodiment is configured to manufacture the thick container 10 having a raised bottom. The stretching ratio from the preform 11 to the container 10 is intentionally set to be small. The preform 11 to be manufactured is thick, and a thickness of a body part thereof may be set to 3.0 mm to 12.0 mm, preferably 4.0 mm to 8.0 mm, for example. Also, a filling capacity of the container 10 may be set to 30 mL to 100 mL, for example.

Subsequently, a method for manufacturing the container 10 in accordance with the second exemplary embodiment is described. The method for manufacturing the container 10 in accordance with the second exemplary embodiment includes an injection molding step S101 of injection molding the preform 11, a temperature adjustment step S102 of adjusting a temperature of the preform 11, and a blow molding step S103 of blow molding the preform 11 whose temperature has been adjusted to manufacture the container 10 (FIG. 4), like the first exemplary embodiment, and the container 10 is taken-out by releasing the neck part U from the neck mold 27.

Figure 10A:
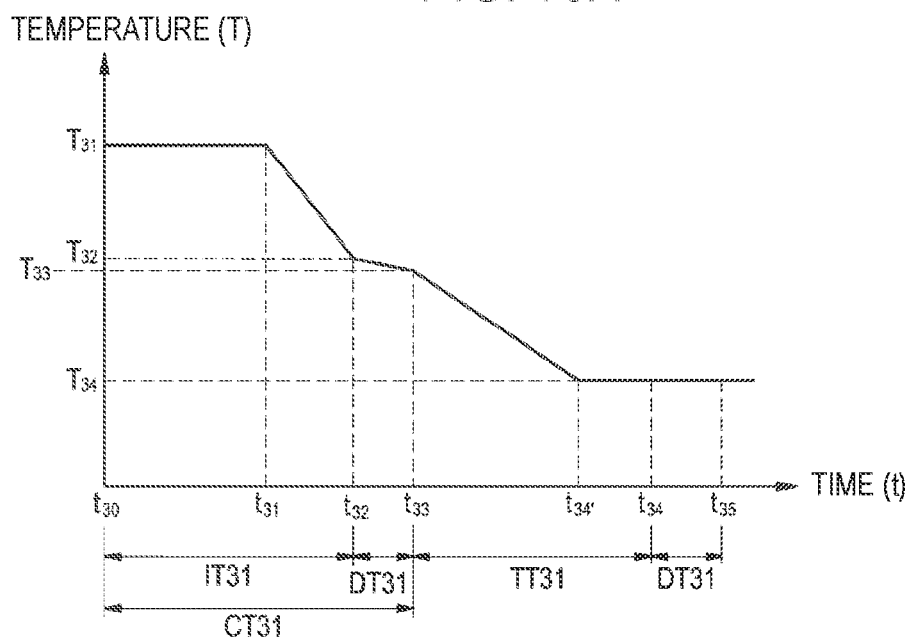
FIG. 10A depicts a change in temperature of a preform over time in the second exemplary embodiment.
Figure 10B:
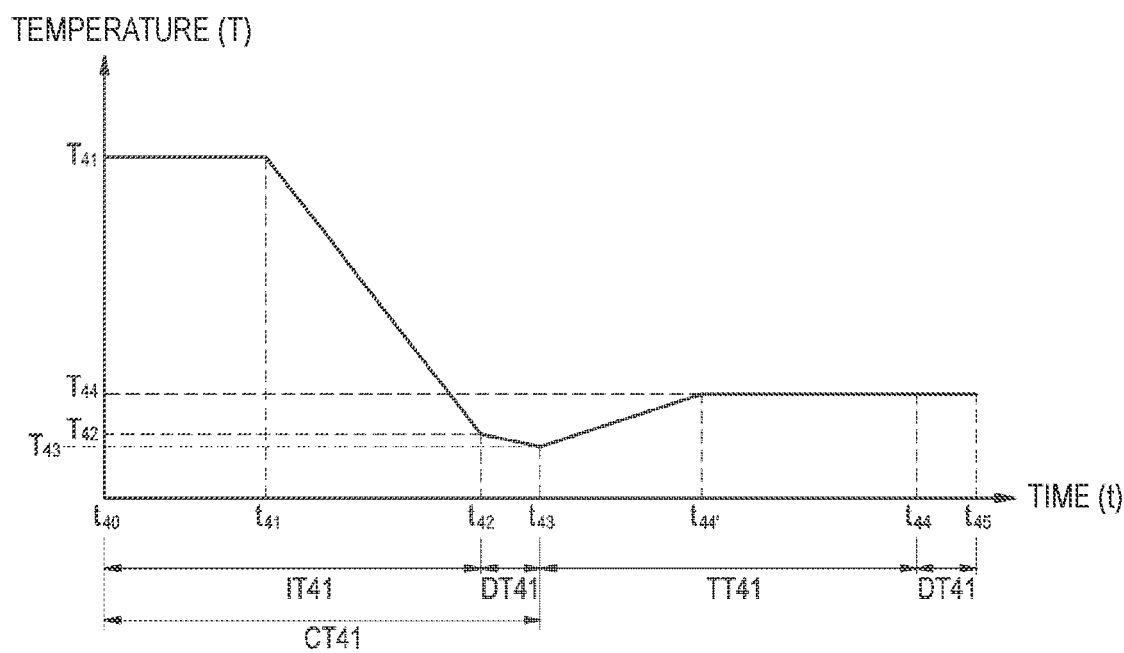
FIG. 10B depicts a change in temperature of a preform over time in the reference example.

The injection molding step S101 is the same as the injection molding step S1 of the first exemplary embodiment. Here, a change in temperature of the preform over time in the injection molding step S101 is described with reference to FIGS. 10A-B. FIGS. 10A-B depicts a change in temperature of a preform over time in the second exemplary embodiment and the reference example, in which FIG. 10A depicts the second exemplary embodiment, and FIG. 10B depicts the reference example. In the injection molding step S101, from a first time t31 (time at which the supply of the resin material is completed) to a second time t32, the preform 11 is cooled from a first temperature T31 to a second temperature T32 (FIG. 10A). The first temperature T31 is a temperature equal to or higher than a melting point of the resin material, and is, for example, 270° C. to 300° C., in the case of PET resin. The time ranging from a starting time t30 to the first time t31 is a filling time (injection time), the time ranging from the first time t31 to the second time t31 is a cooling time, and the time ranging from the starting time t30 to the second time t32 is an injection molding time IT31 (filling time (including pressure holding time)+cooling time). Also, from the second time t32 to a third time t33 (start time of the temperature adjustment step S102), the preform 11 is cooled from the second temperature T32 to a third temperature T33 (FIG. 10A). The time ranging from the second time t32 to the third time t33 is a conveying time DT31 of the preform 11 or the container 10 between the respective steps, and indicates time for which the preform 11 is conveyed from the injection molding part 21 to the temperature adjustment part 121, in FIGS. 10A-B. In the meantime, due to the structure of the molding machine 120, the conveying time DT31 between the steps is all the same. A sum of the injection molding time IT31 and the conveying time DT31 is a molding cycle time CT31.

Figure 8A:
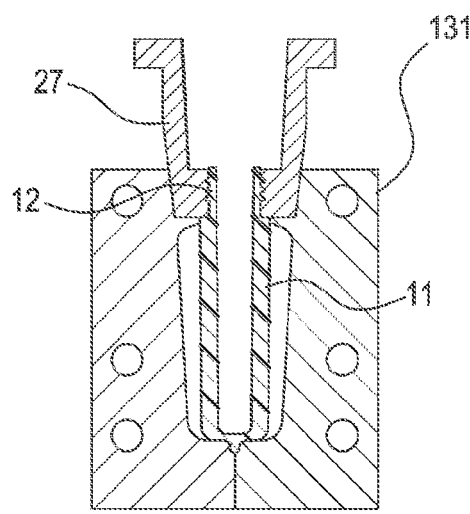
FIG. 8A-D are pictorial sectional views depicting an aspect of adjusting a temperature of a preform in a temperature adjustment part of a second exemplary embodiment.
Figure 8B:
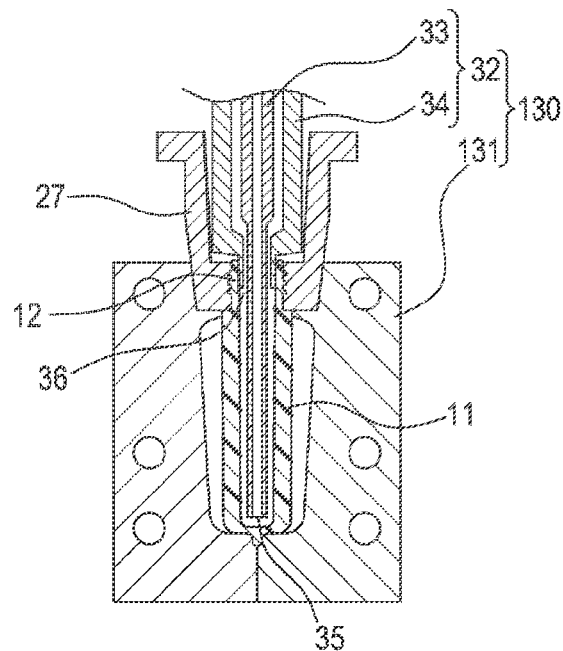
Figure 8C:
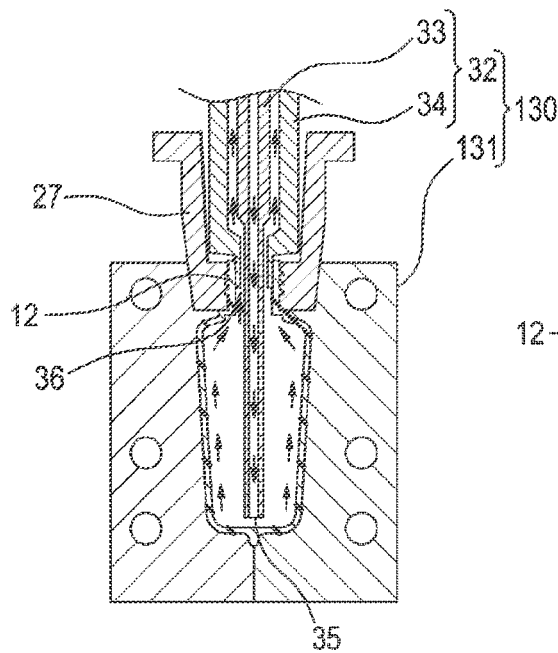
Figure 8D:
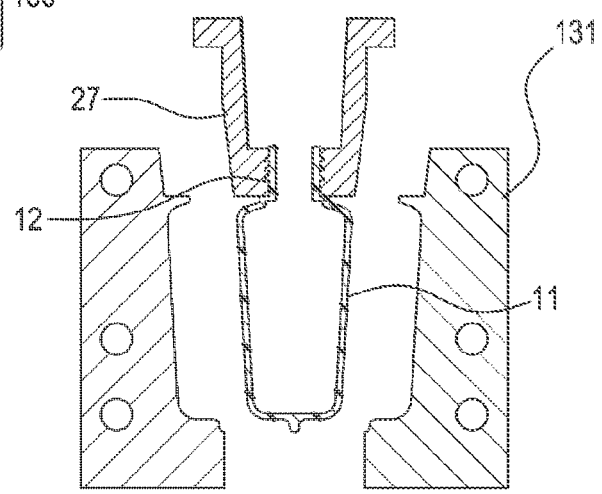

Subsequently, the temperature adjustment step S102 is described with reference to FIGS. 8A-D. First, the preform 11 is moved between the opened cavity mold 131 and the cavity mold 131 is closed to accommodate the preform 11 in the cavity mold 131 (FIG. 8A). Then, the first air introduction member 32 is inserted into (is brought into airtight contact with) the preform 11 accommodated in the cavity mold 131 (FIG. 8B). Then, preliminary blow of supplying the air into the preform 11 from the first inner flowing port 35 of the first air introduction member 32 with the outer flowing port 36 being closed and bulging the preform 11 to bring the same into close contact with the inner wall of the cavity mold 131 is performed. Then, cooling blow of opening the first outer flowing port 36 and discharging the air to the outside of the preform 11 from the first outer flowing port 36 of the first air introduction member 32 is performed (FIG. 8C). At this time, since the air is continuously ejected from the first inner flowing port 35, the preform 11 is cooled from an inner side by convection of the air flowing therein, too. After the cooling for a predetermined time, the cavity mold 131 is opened (FIG. 8D), and the bulged preform 11 is moved to the blow molding part 123.

Here, a change in the temperature of the preform over time is again described with reference to FIGS. 10A-B. In the temperature adjustment step S102, from the third time t33 to a fourth intermediate time t34', the preform 11 is cooled from the third temperature T33 to a fourth temperature T34, and the temperature of the preform 11 is then kept at the fourth temperature T34 up to a fourth time t34 (FIG.

10A). The fourth temperature T34 is a temperature suitable for blow molding, and is, for example, 90° C. to 105° C., in the case of the PET resin (preferably, 90° C. to 95° C., like the first exemplary embodiment). After the fourth time t34, the cooling in the temperature adjustment step S102 is continuously performed until the cooling of the preform 11 in the injection molding step S101 is completed.

Figure 9A:
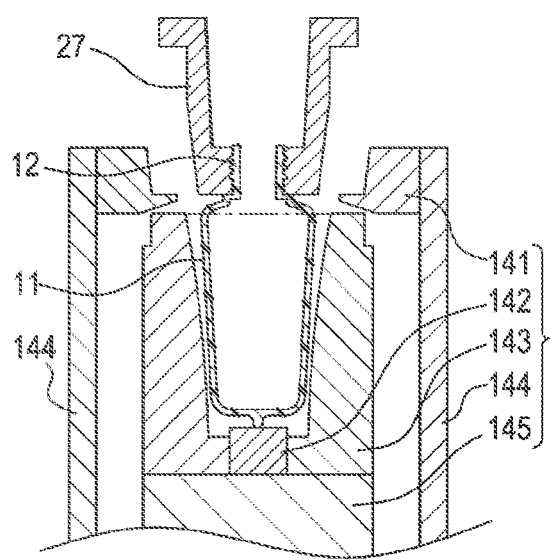
FIG. 9A-D are pictorial sectional views depicting an aspect of blow molding by which a container is manufactured from the preform in the blow molding part of the second exemplary embodiment.
Figure 9B:
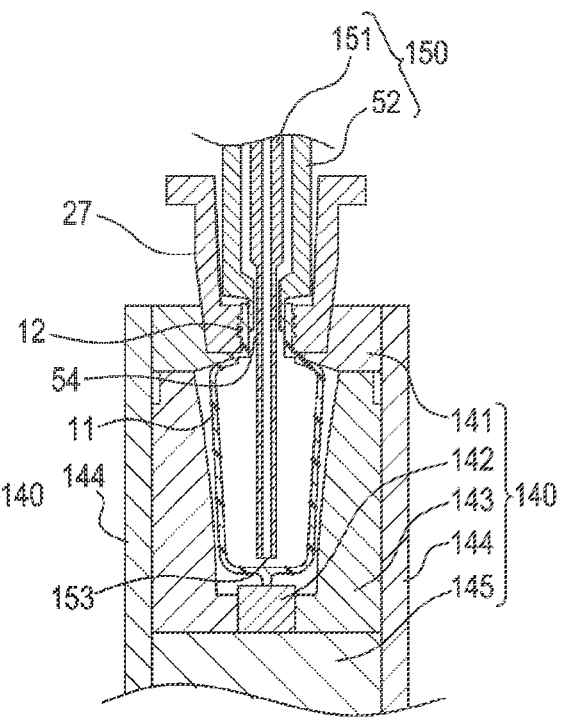
Figure 9C:
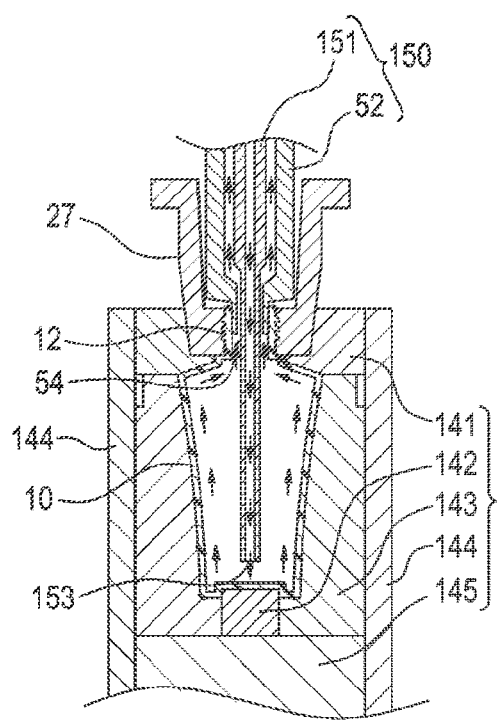
Figure 9D:
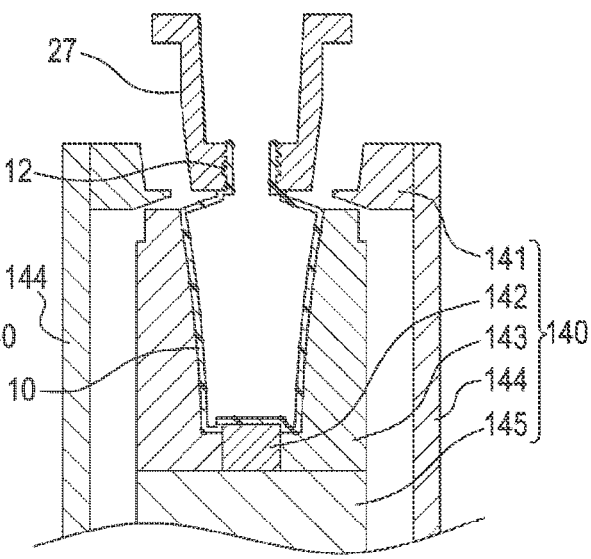

Subsequently, the blow molding step S103 is described with reference to FIGS. 9A-D. First, the preform 11 is accommodated in the mold 140 where the bottom mold 142 and the base mold 143 are stationary and the shoulder mold 141 is opened (FIG. 9A). Then, the shoulder mold 141 is closed and fitted to the neck mold 27, and the second air introduction member 150 is inserted (is brought into airtight contact, FIG. 9B). Then, the preform 11 is bulged into a shape of the container 10 by final blow of supplying the air from the second outer flowing port 54 into the preform 11. Thereafter, the container 10 is manufactured by the cooling blow of supplying the air from the second inner flowing port 153 into the preform 11 and discharging the air from the second outer flowing port 54 to an outside of the preform (FIG. 9C). After the final blow and the cooling blow are completed, the bottom mold 142 and the base mold 143 are slightly moved down, the shoulder mold 141 is opened and the container 10 is removed from the mold 140. In the meantime, the cooling blow may be omitted if the cooling can be sufficiently performed only by the contact between the mold 140 and the preform 11.

The container 10 removed from the mold 140 is moved to the take-out part 24, and the neck part 12 is released from the neck mold 27 to remove the container 10. By the above method, the container 10 is manufactured.

As shown in FIG. 10B, according to a related-art method for manufacturing a container made of resin, in the injection molding step, from a first time t41 (time at which the supply of the resin material is over) to a second time t42, the preform is cooled from a first temperature T41 to a second temperature T42 lower than or substantially equal to a fourth temperature T44. Then, in the temperature adjustment step, from a third time t43 to a fourth time t44, the temperature of the preform 11 is increased from a third temperature T43 to the fourth temperature T44. For this reason, the cooling time in the injection molding step is prolonged, so that a molding cycle time CT41 of the container is prolonged. Also, when molding a thick container, more time is required to cool the preform, so that the molding cycle time CT41 of the container is further prolonged.

According to the method for manufacturing the container 10 made of resin in accordance with the second exemplary embodiment, the preform 11 is cooled in the injection molding step S101 and can be cooled in the temperature adjustment step S102, too. In particular, in the temperature adjustment step S102, the air is sent into the preform 11, so that the preform 11 is bulged to closely contact the cavity mold 131. Thereby, it is possible to obtain the preform 11 having an appropriate outer shape while effectively cooling the outer surface of the preform 11. Also, since the air continuously flows to generate the convention without being confined in the preform 11, the inner surface of the preform 11 can also be cooled at the same time, so that it is possible to quickly cool the preform 11, as compared to the related art. Also, the preform 11 can be demolded even at high temperatures in the injection molding step S101 by the cooling in the temperature adjustment step S102, so that it is possible to quickly start molding of a next preform 11. That is, it is possible to effectively cool the preform 11 in a cooperative manner by the injection molding step S101 and the temperature adjustment step S102, so that it is possible to favorably mold a final molded article while shortening the molding cycle time CT31.

Also, in the case of the thick preform 11, even when the outer wall of the preform 11 is cooled from one side, an inside of the outer wall and an opposite side to the cooled side are difficult to be cooled, so that much time is required for cooling to a temperature suitable for blow molding. However, according to the method for manufacturing the container 10 made of resin in accordance with the second exemplary embodiment, since it is possible to obtain the thin preform 11 having an appropriate outer shape (an outer shape close to the container 10) while effectively cooling the outer surface of the preform 11 in the temperature adjustment step S102 and to cool the inner surface of the preform 11 at the same time, it is possible to effectively and quickly cool the thick preform 11, as compared to the related art. Also, the preform 11 can be demolded at high temperatures in the injection molding step S101 by the cooling in the temperature adjustment step S102 and can be then moved to a next step, so that it is possible to quickly start molding of a next preform 11. Accordingly, it is possible to favorably mold a final molded article while shortening the molding cycle.

Also, according to the mold unit 130 of the second exemplary embodiment, the first air introduction member 32 having the first inner flowing port 35 and the first outer flowing port 36 is provided to enable the air to continuously flow without being confined in the preform 11, thereby generating the convention. Thereby, it is possible to effectively cool the preform 11 from the inner surface of the preform 11. Also, the preform 11 can be bulged to closely contact the cavity mold 131 by the air, so that it is possible to obtain the preform 11 having an appropriate outer shape while effectively cooling the outer surface of the preform 11.

Also, according to the mold unit 130 of the second exemplary embodiment, since it is possible to obtain the preform 11 having an appropriate outer shape while effectively cooling the outer surface of the preform 11 and to cool the inner surface of the preform 11 at the same time, it is possible to effectively and quickly cool the thick preform 11, as compared to the related art.

In the meantime, the present invention is not limited to the exemplary embodiments and can be appropriately modified and improved. In addition, the materials, shapes, sizes, numerical values, forms, numbers, arrangement places and the like of the respective constitutional elements of the exemplary embodiments are arbitrary and are not particularly limited inasmuch as the present invention can be implemented.

In the blow molding part of the exemplary embodiments, although the second rod member 51 to be used for cooling blow has been described, any blow apparatus that can appropriately bulge the preform 11 into the container 10 can be used. For example, the blowing and discharging of the air between the second inner flowing port 53 and the second outer flowing port 54 may not be switched.

In the meantime, the mold opening and closing direction of the mold of the injection molding part is preferably the vertical direction (longitudinal direction). If the mold opening and closing direction is a horizontal direction (lateral direction), the preform to be demolded from the injection molding part is in a highly softened state at higher temperatures than usual, so that the bottom side of the preform extending in the horizontal direction is bent vertically downward from a relation of the center of gravity while it is conveyed to the temperature adjustment part and the cooling blow may not be able to be performed to the preform having a normal shape. On the other hand, when the mold opening and closing direction of the mold of the injection molding part is the vertical direction (longitudinal direction), the bending deformation is not caused, so that the cooling blow can be performed for the preform having the normal shape.

In the meantime, the subject application is based on Japanese Patent Application No. 2017-202716 filed on Oct. 19, 2017, the contents of which are incorporated herein by reference.

REFERENCE SIGNS LIST

10: container, 11: preform, 12: neck part, 20, 120: molding machine, 21: injection molding part, 22, 122: temperature adjustment part, 23, 123: blow molding part, 24: take-out part, 25: injection apparatus, 26: conveying means, 27: neck mold, 30, 130: mold unit, 31, 131: cavity mold, 32: first air introduction member, 33: first rod member, 34: first fitting core (first blow core member), 35: first inner flowing port, 36: first outer flowing port. 40, 140: mold, 141: shoulder mold, 42, 142: bottom mold, 43: split mold, 143: base mold, 50, 150: second air introduction member, 51, 151: second rod member, 52: second fitting core (second blow core member), 53, 153: second inner flowing port, 54: second outer flowing port

The invention claimed is:

1. A method for manufacturing a container made of resin, the method comprising at least:
   injection molding a bottomed preform made of resin;
   adjusting a temperature of the preform manufactured in the injection molding; and
   blow molding the preform whose temperature has been adjusted to manufacture the container made of resin,
   wherein, in the injection molding,
      a resin material is injected into a space having a shape of the preform, the space being formed by mold-clamping an injection molding mold,
      the resin material is cooled inside the space after the injection of the resin material has been completed, and
      a time during which the resin material is cooled in the space after the injection of the resin material has been completed is half or less of a time during which the resin material is injected.

2. The method for manufacturing a container made of resin according to claim 1,
   wherein the time during which the resin material is cooled in the space after the injection of the resin material has been completed is ⅖ or less of the time during which the resin material is injected.

3. The method for manufacturing a container made of resin according to claim 1,
   wherein the time during which the resin material is cooled in the space after the injection of the resin material has been completed is 0.43 times or less of the time during which the resin material is injected.

4. The method for manufacturing a container made of resin according to claim 1,
   wherein the injection molding mold includes at least an injection cavity mold and an injection core mold, and
   wherein a cooling medium whose temperature is within a range of 5° C. to 15° C. flows in the injection cavity mold and the injection core mold.

5. The method for manufacturing a container made of resin according to claim 1,
   wherein, in the temperature adjustment,
      the preform is accommodated in a cavity mold,
      an air introduction member is brought into airtight contact with the preform, and
      air is supplied from a blowing port of the air introduction member into the preform and the air is discharged from a discharge port of the air introduction member to an outside of the preform, so that the preform is in close contact with an inner wall of the cavity mold and is cooled.

6. The method for manufacturing a container made of resin according to claim 5,
   wherein a temperature adjusting medium flows in the cavity mold,
   wherein, in the temperature adjustment, the preform is temperature-adjusted from an outer side by the close contact with the cavity mold, and
   wherein the preform is cooled from an inner side by convection of the air from the air introduction member.

7. The method for manufacturing a container made of resin according to claim 6,
   wherein the temperature adjusting medium whose temperature is within a range of 5° C. to 80° C. flows in the cavity mold.

8. The method for manufacturing a container made of resin according to claim 6,
   wherein the temperature adjusting medium whose temperature is within a range of 30° C. to 60° C. flows in the cavity mold.

* * * * *